No. 847,422. PATENTED MAR. 19, 1907.
C. A. MARQUIS.
WINDING AND MEASURING MACHINE.
APPLICATION FILED MAY 22, 1906.
5 SHEETS—SHEET 1.
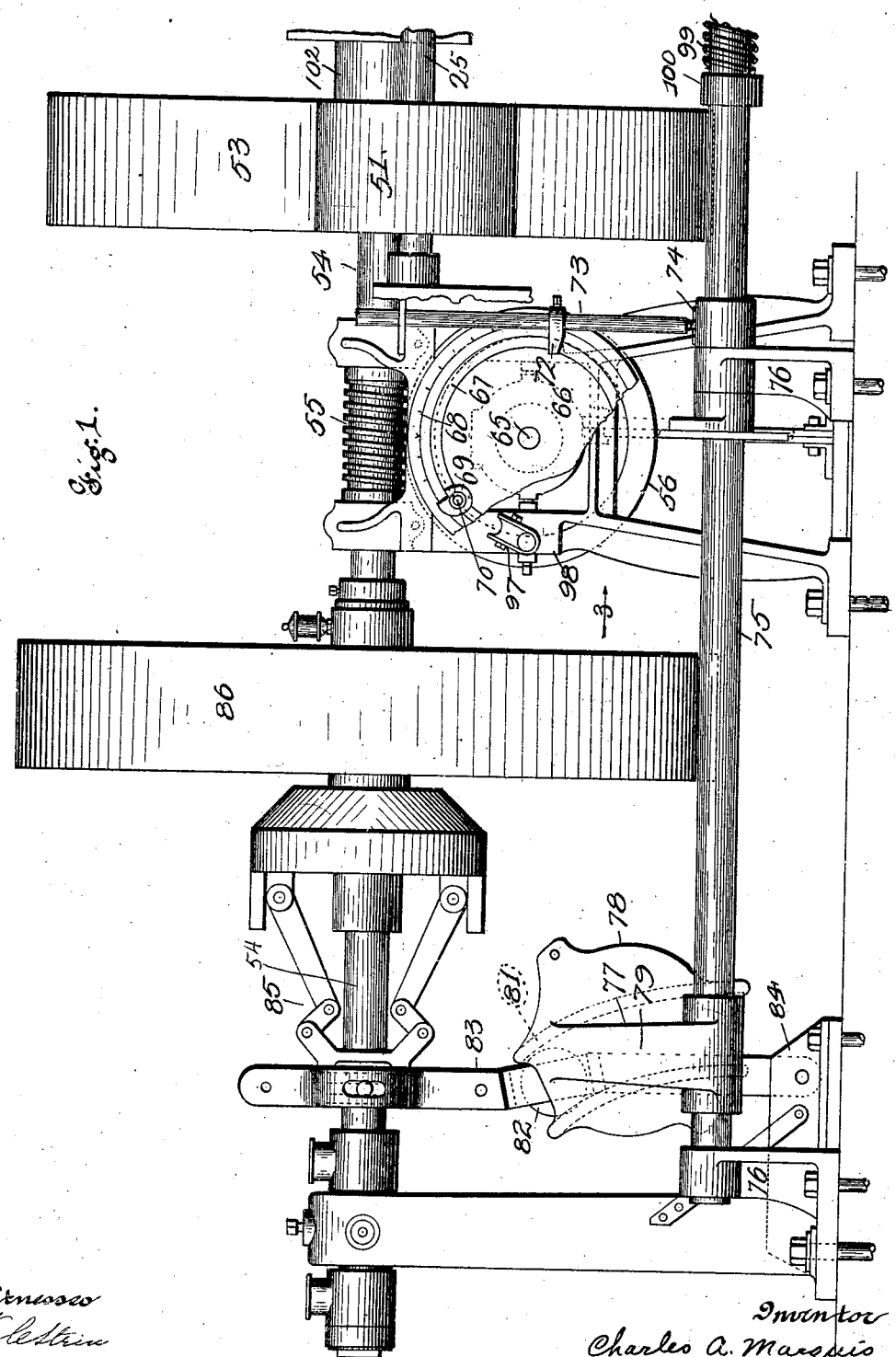

No. 847,422. PATENTED MAR. 19, 1907.
C. A. MARQUIS.
WINDING AND MEASURING MACHINE.
APPLICATION FILED MAY 22, 1906.
5 SHEETS—SHEET 2.
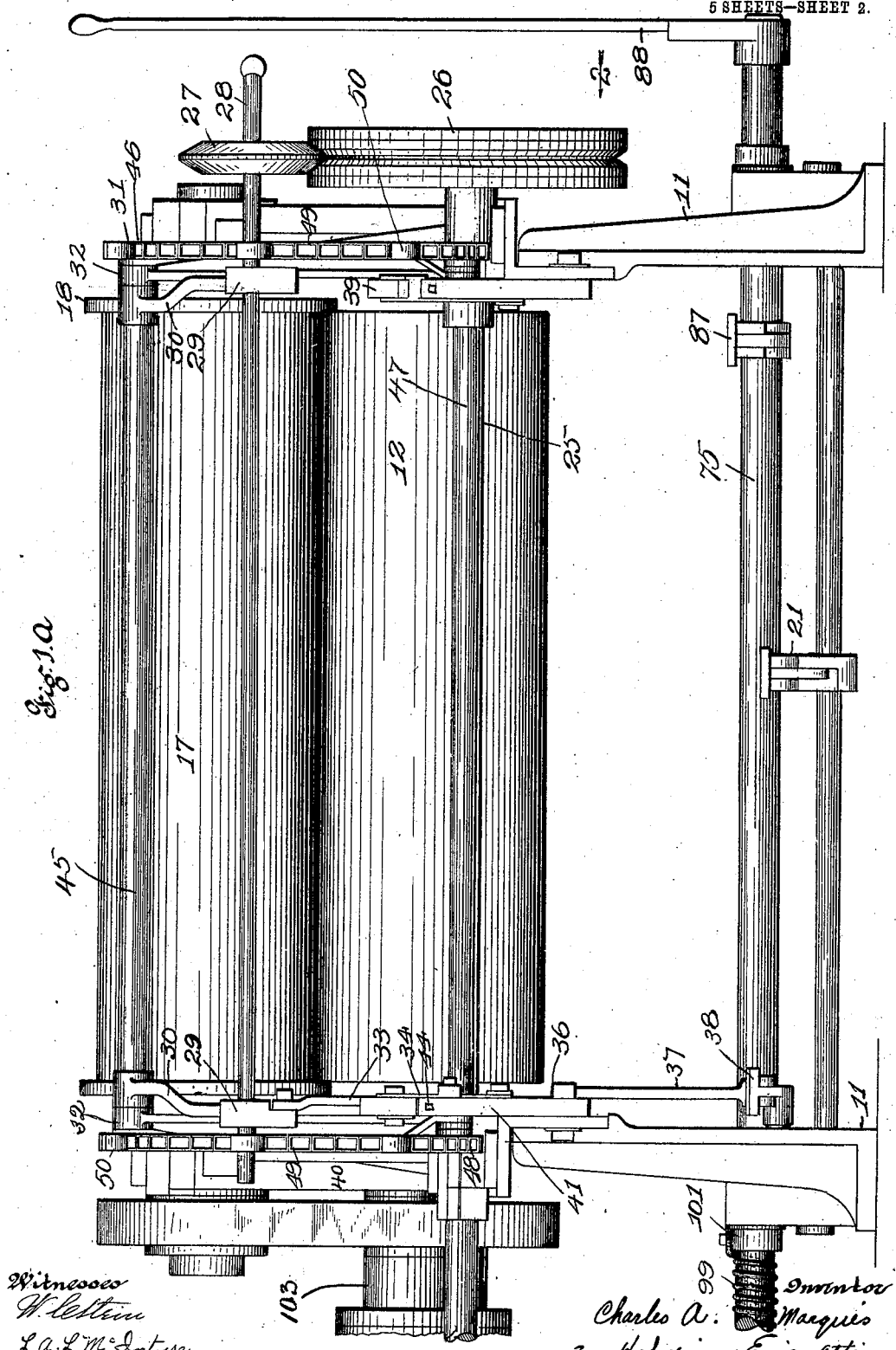

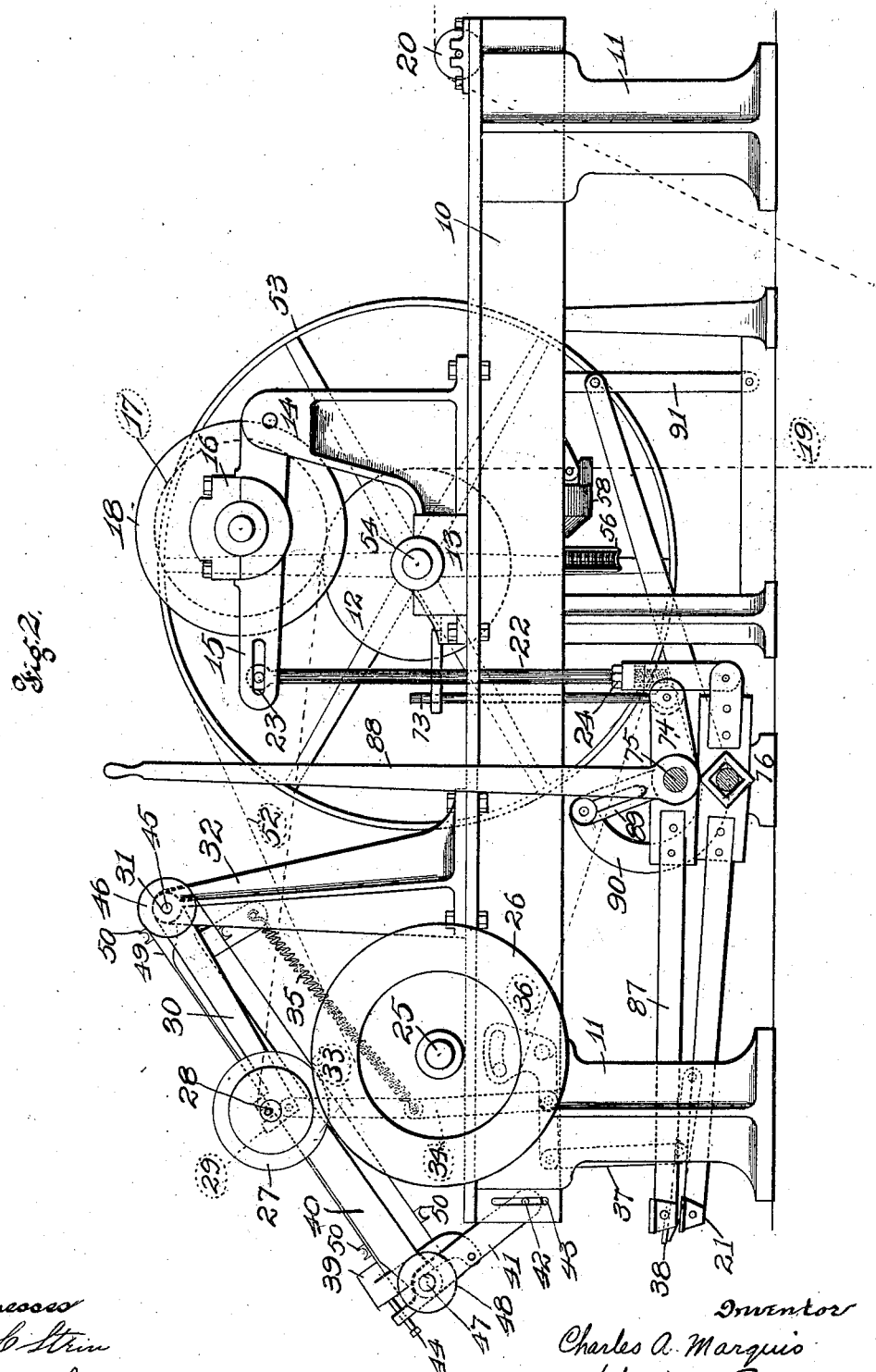

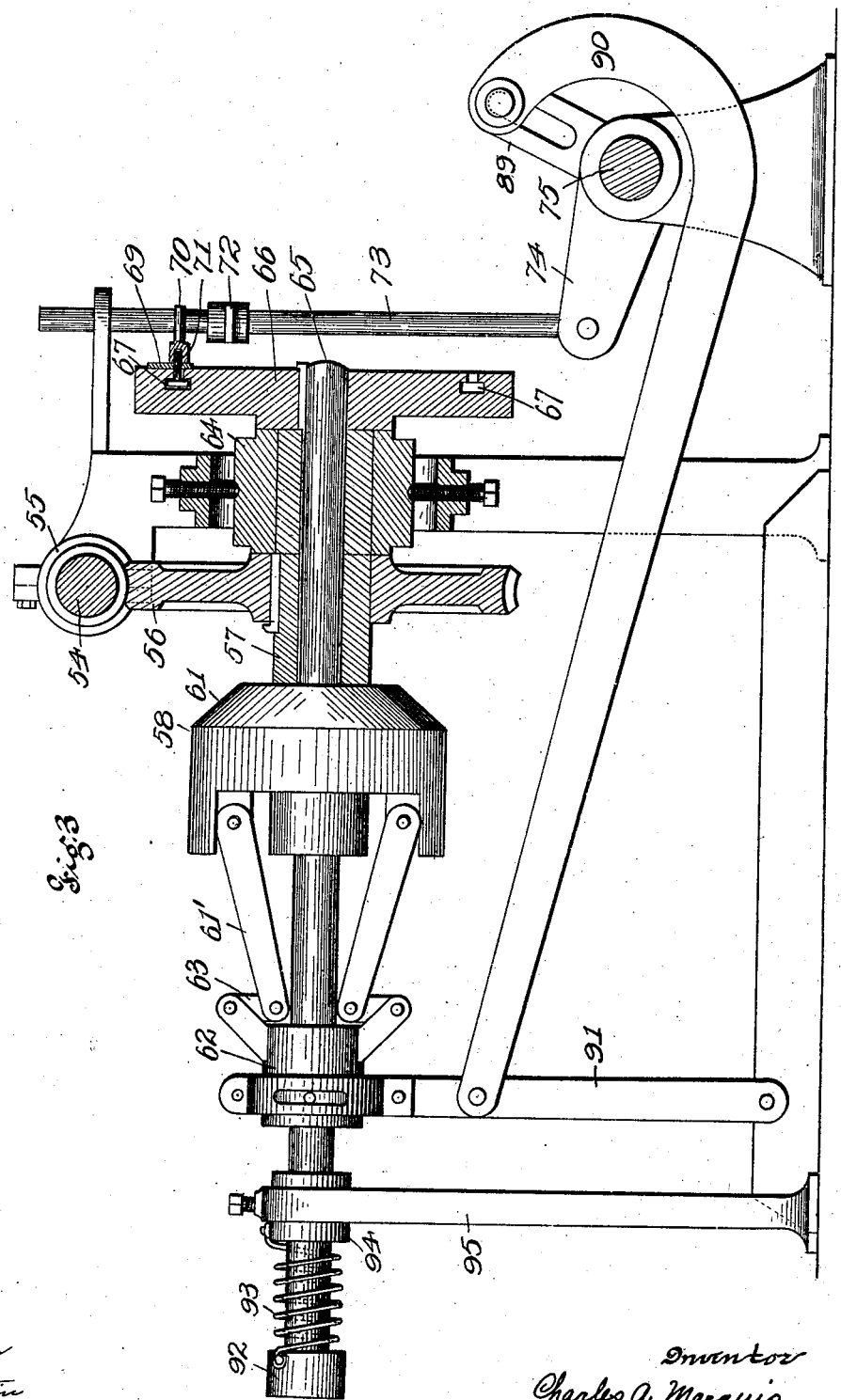

No. 847,422. PATENTED MAR. 19, 1907.
C. A. MARQUIS.
WINDING AND MEASURING MACHINE.
APPLICATION FILED MAY 22, 1906.
5 SHEETS—SHEET 5.
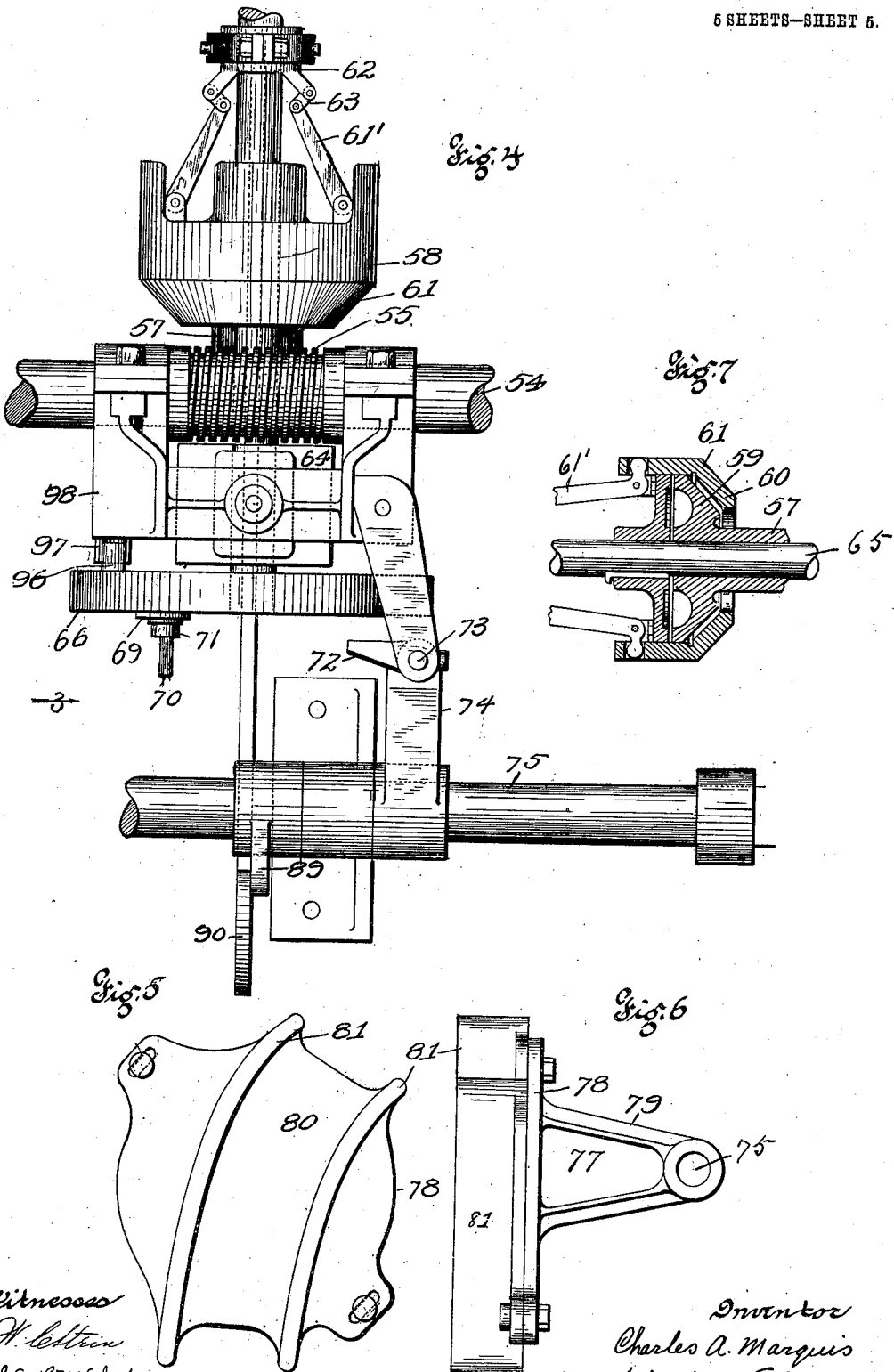

UNITED STATES PATENT OFFICE.

CHARLES A. MARQUIS, OF ST. LOUIS, MISSOURI.

WINDING AND MEASURING MACHINE.

No. 847,422.  Specification of Letters Patent.  Patented March 19, 1907.

Application filed May 22, 1906. Serial No. 318,269.

*To all whom it may concern:*

Be it known that I, CHARLES A. MARQUIS, a citizen of the United States, and a resident of St. Louis, Missouri, have invented certain new and useful Improvements in Winding and Measuring Machines, of which the following is a specification.

This invention relates to improvements in a winding and measuring machine for saturated tar-paper and the like, and consists in the novel arrangement, construction, and combination of parts, as will be fully hereinafter described and claimed.

The object of my invention is to construct a machine to wind tar-paper after it has been passed through a vat and thoroughly saturated, the surplus material being removed while the paper is passing between rollers, and to automatically measure the amount of paper rolled, and to stop the winding of the material when the number of feet required is contained in the roll.

The further object of my invention is to provide a machine of this character with a measuring mechanism which is arranged adjustable to automatically place the winding mechanism out of operation when the required number of feet is contained within the roll, and to also provide a mechanism upon which the spindles containing the roll are to be removed and a second spindle automatically placed in position to receive the paper for the following roll.

In the drawings, Figure 1 is a front elevation of one half of my invention. Fig. 1<sup>A</sup> is a front view of the remaining half of my invention. Fig. 2 is an end view viewing the same in the direction indicated by the arrow 2 in Fig. 1<sup>A</sup>. Fig. 3 is a detail side view of the measuring mechanism with a part in section, showing its construction and viewing the same in the direction as indicated by the arrow 3 in Figs. 1 and 4. Fig. 4 is a detail top plan view of the same. Fig. 5 is a detail face view of the clutch-releasing cam made use of in connection with my invention. Fig. 6 is a side view of the same. Fig. 7 is a detail central sectional view of the clutch made use of in connection with the measuring mechanism.

In the construction of the device as shown I provide a suitable frame 10, mounted upon standards 11, and upon the frame 10 is mounted an elongated roller 12, supported in suitable journal-bearings 13. Upon the frame 10 is also secured upwardly-projecting brackets 14, Fig. 2, in which are pivotally-connected arms 15. These arms 15 are provided with journal-boxes 16, in which is revolubly mounted an elongated roller 17, the periphery of which is arranged to come in contact with the periphery of the elongated roller 12. The roller 17 is provided on each end with a projecting flange 18, which is arranged to project over the ends of the roller 12, Fig. 1<sup>A</sup>, and between the rollers 12 and 17 is passed the strip of paper, which is shown by dotted lines in Fig. 2 and designated by the numeral 19. The paper 19 before entering between the rollers 12 and 17 is placed to the rear of the machine in its ordinary rolled form and conducted over the guide-roller 20, supported on the end of the frame 10. From thence the paper is passed downwardly around a guide-roller located in a suitable vat of ordinary construction formed below the machine and in which is placed the tar product to be saturated into the paper, and as the paper passes between the rollers 12 and 17 the surplus material is removed from the paper and permitted to pass downwardly into the vat.

The roller 17 is adjustably mounted and is operated by means of the foot-lever 21, its rear end contacting with the rod 22, the upper end of which being connected to the arms 15 and is provided with lateral movement by means of the slot 23. This rod 22 is adjustably connected by means of the nut 24.

I will not go into the minute details of the roller mechanism through which the paper is passed, as this is of ordinary construction, but is used in connection with my improved attachment.

I will now describe the portion of the machine which I claim is my invention, and it consists of a shaft 25, located in suitable bearings upon the front end of the frame 10 and on the end of which I provide a friction-wheel 26, which contacts with a friction-pinion 27, formed on the spindle 28. The spindle 28 is held within pockets 29, formed on the end of the levers 30, which are pivotally connected at the point indicated by the numeral 31 at the upper end of the brackets 32, which are supported upon the frame 10.

Connected to the end of the lever 30 directly below the pocket 29 is a link 33, its opposite end connected to the upper end of a bell-crank lever 34, and to the connecting-pivot is attached a spring 35, by which said link and bell-crank lever are retained in vertical position, the opposite end of the spring being attached to the bracket 32. (See Fig. 2.)

The bell-crank lever 34 is pivotally connected to an adjustable bracket 36, adjustably connected to the side of the frame 10, and to the short end of the bell-crank lever is attached a link 37, which contacts with a foot-treadle 38, by which the lever 30 is lowered to release the spindle 28 from the pocket after a sufficient number of feet of paper has been wound upon the same to pass downwardly and come in contact with the bumpers 39, formed on the lower end of the tilted frame 40.

The tilted frame 40 consists of a pair of side bars, the upper end connected to the bracket 32 and the lower end attached to the frame 10 by means of the brackets 41, and by said brackets 41 the side bars may be adjusted to any angle by means of the bolts 42 passing through the bracket 41 and operate in the vertical slots 43, formed in the frame 10. The upper ends of the brackets 41 are provided with adjusting-screws 44, by which the bumpers 39 may be adjusted forward or rearward, as the case may desire.

At the point indicated by the numeral 31 and extending from bracket to bracket 32 is a shaft 45, upon the ends of which are mounted sprocket-wheels 46, and at the lower end of the side bars and passing through the brackets 41 is a second shaft 47, the outer ends being provided with the sprocket-wheels 48 and located in alinement with the sprocket-wheels 46, and over these wheels are placed sprocket-chains 49, on which are located at suitable intervals apart projecting fingers 50, forming pockets for the insertion of the spindles 28.

During the operation and while a spindle is in position within the pockets 29, formed on the levers 30, a spindle is placed within the pockets carried by the sprocket-chains, and by reason of said pockets being located upon the chains at proper intervals apart will cause the same during the operation to be located upon the highest point of the tilting frame, and when the required amount of paper has been rolled upon the spindle, the foot-lever is pressed upon, thereby releasing the spindle from the pockets 29 and through its own gravity will cause the sprocket-wheels to revolve and permit the roll of paper, together with the spindle, to pass downwardly and contact with the bumpers 39. At the same juncture the spindle located in the top pockets of the chain will be brought in alinement with the pockets 29, formed on the levers 30, and when said foot-lever 38 is released the levers 30 are brought upwardly and the spindles rigidly held in position within the pockets 29 formed thereon.

This mechanism is driven by means of a small pulley 51, Fig. 1, motion being imparted thereto by means of the belt 52 (shown by dotted lines in Fig. 2) and passing over the large pulley 53, the large pulley 53 being mounted upon the shaft 54, to which the roller 12 is connected. Upon the shaft 54 and to the opposite side of the large pulley 53 I provide a worm-gear 55, which meshes with and operates a worm-wheel 56, keyed upon the sleeve 57, which forms a part of the clutch mechanism 58, Figs. 3 and 4. The flange 59, Fig. 7, of the sleeve 57, arranged to come in contact with the flange 60, formed on the outer member 61 of the clutch mechanism, and the outer member and flange are brought in close operative contact and also released when desired by means of the fulcrum 61', connected to the sliding sleeve 62 by means of the links 63.

The sleeve 57 is mounted within a bearing 64, Fig. 3, and upon a short shaft 65. Upon the outer end of said shaft is a measuring-disk 66, in which is formed a slot 67 and a graduated surface or scale 68. In this slot 67 is adjustably located an indicator-plate 69 and a projecting contacting lug 70. The contacting lug is held in position by means of the screw 71, projecting from the slot 67, and when slightly released the contacting lug, together with the indicator-plate, may be adjusted to any graduation or mark of the scale to the required number of feet of paper to be wound upon the spindle. This operation is accomplished while the indicator-disk is in operation and the contacting lug brought in contact with the projecting finger 72, located upon the connecting-rod 73. The lower end of the connecting-rod 73 is attached to the lever 74, which is rigidly connected to the operating-shaft 75.

The operating-shaft 75 is located below the frame 10 and supported in suitable bearings 76, and upon the opposite end of the operating-shaft 75 I provide a cam 77, Fig. 1. The cam 77 consists of a plate 78, connected to a bracket 79, by which the same is supported upon the operating-shaft. Upon the front face of the plate 78 is adjustably connected the cam-plate 80, which is provided with two curved projecting portions 81, which are constructed to come in contact with a roller 82, supported upon the clutch-operating arm 83, the lower end of which being pivotally connected to a support 84 and the upper end of said arm passing around the sleeve of the clutch mechanism 85, which is mounted upon the shaft 54, and by the operation of the clutch mechanism 85 the driving-pulley 86 is controlled to place the machine in operation or permit it to revolve freely upon the shaft.

The shaft 75 is provided with a foot-treadle 87 and a hand-lever 88, Figs. 1ᴬ and 2, by either of which the cam 77 may be brought in contact with the shifting-arm to tighten or release the clutch mechanism 85. Upon said shaft is also located a slotted arm 89, Fig. 3, to which is connected a curved connecting-rod 90, which is passed around the under side of the shaft 75 and its opposite end connected to a shifting-arm 91, which is connected to the sleeve 62 of the clutch mechanism 58 for placing the disk 66 in and out of operation. On the shaft 65, to which the disk 66 is secured, and upon its opposite end is provided a collar 92, to which one end of a spiral spring 93 is fastened and the opposite end of said spring connected to the journal-box 94, formed in the standard 95, in which said shaft is supported. The object of this spring is to place the disk 66 in its normal position when the clutch mechanism has been released by the contact of the lug 70 with the finger 72. This reaction is permitted when the clutch is released, although the worm-gear 55 and worm-wheel 56 may operate idly. The motion of the disk 66 is limited when returned to its normal position by means of a lug 96, Fig. 4, formed on the rear side of the disk 66, and comes in contact with the stop 97, formed on the supporting-frame 98, which supports the entire measuring mechanism. The shaft 75 is provided with a retractile coil-spring 99, its one end secured to a collar 100, formed on the shaft, and its opposite end secured to the journal-bearing 101, in which said shaft is supported. The purpose of this spring is to counterbalance the weight of the cam 77 when operated.

The shaft 54 projects through the wheel 53 and is provided with a flanged collar 102, which communicates with a like flanged collar 103, secured to the one end of the second section of the shaft 54, which operates the roller 12. These two flanged collars form a coupling whereby the two sections of the machine are secured together.

The operation of my invention is as follows: After the end of the paper has first been passed through the vat it is passed between the rollers 12 and 17, and to admit the insertion of the paper between said rollers the operator slightly raises the roller 17 by means of the foot-lever 21. The paper is then conveyed and fastened in any desired manner to the spindle 28, which is held in the pockets 29. The indicator-plate upon the disk 66 is set to the proper number, designating the number of feet desired to be wound upon the spindle, and when this has been done the operator either pulls upon the lever 88 or by using the foot-treadle 87 will operate the cam 77, thereby tightening the clutch mechanism 85, and at the same operation the lever 90 will operate the arm 91 and tighten the clutch mechanism 58 and cause the entire machine to operate, and by means of the worm-gear 55 and worm-wheel 56 the disk 66 is slowly revolved while the material is being wound upon the spindle 28, motion being imparted to the spindle by the contacting of the friction-pinion 27 with the friction-wheel 26. While this operation is in progress, the operator places an additional spindle in the uppermost pockets formed on the sprocket-chains 49, and when the desired number of feet has been wound upon the spindle the contacting lug 70 comes in contact with the finger 72 and presses downwardly upon the arm 74 by means of the rod 73, partly revolving the shaft 75, which will simultaneously cause the arm 90, together with the cam 77, to operate both clutches and release the same, thereby automatically discontinuing the operation of the entire machine, and will permit the driving-pulley 86 to revolve freely until the clutches are again tightened by use of the hand-lever or foot-treadle 87. After the machine has been automatically stopped the operator then cuts the paper, and by operating the foot-lever 38 and through the agency of the links 37 and 33 and the bell-crank lever 34 the arms are lowered, releasing the spindle from the pockets 29, and by the gravity of the roll of paper upon the spindle will pass downwardly upon the inclined frame and come in contact with the bumpers 39. During this same movement the spindle which has been placed in the uppermost pockets is brought in alinement with the pockets 29 at the same time its friction-pinion contacting with the friction-wheel 26, and as the operator releases the tension upon the foot-lever 38 the spring 35 will raise the arms 30 and retain the spindle in position to receive the material to be rolled thereon.

Having fully described my invention, what I claim is—

1. A winding and measuring machine comprising a frame, a spindle located upon said frame for receiving material to be wound, a measuring device, a lever mechanism, a clutch for transmitting motion to the machine, said clutch controlled by the lever mechanism, means communicating with the lever mechanism for automatically releasing the clutch to discontinue the operation of the machine, substantially as specified.

2. A device of the class described comprising a frame, endless carriers located upon the frame, spindles carried and supported by the endless carriers, said spindles provided with the friction-pinions, a friction-wheel for operating the friction-pinions, means for supporting the spindle while the material is being wound thereon, a measuring mechanism, and means for controlling the operation of the winding mechanism to regulate the number of feet of material to be wound upon the spindle, substantially as specified.

3. A device of the class described comprising a suitable frame, standards mounted upon the frame, and a tilted frame supported by said standards, endless carriers located in the tilted frame, pockets located on the endless carriers, spindles supported in the pockets, arms pivotally connected to the frame and provided with pockets for supporting a spindle while the material is being wound thereon, a mechanism for releasing the spindle from the arms, a measuring mechanism operated by the driving mechanism, a means for automatically discontinuing the operation of the entire machine when the desired number of feet of material is wound upon the spindle, substantially as specified.

4. A device of the class described comprising a winding mechanism mounted upon a frame, a measuring mechanism including a revolving disk, an indicator adjustably located upon said disk to be set at any desired location to designate the number of feet of material to be wound by the winding mechanism and means for discontinuing the operation of the winding mechanism and simultaneously return the revolving measuring-disk to its normal position, substantially as specified.

5. A device of the class described comprising a winding mechanism mounted upon a frame, a measuring mechanism including a revolving disk, an indicator adjustably located upon said disk to be set at any desired location to designate the number of feet of material to be wound by the winding mechanism and means for discontinuing the operation of the various mechanisms by the revolving measuring-disk, and means for simultaneously replacing the disk in normal position, substantially as specified.

6. A device of the class described comprising a winding mechanism and a measuring mechanism in combination with rollers through which the material is passed, clutches for controlling the operation of the mechanisms, a suitable lever mechanism operating the clutches, a contacting lug carried by the measuring mechanism and an operating-rod which is operated by the contacting lug to automatically release the clutches and stop the operation of the mechanisms, substantially as specified.

7. A winding and measuring machine comprising a slotted graduated measuring-disk, an indicator-plate adjustably mounted within the slot, means for releasing the measuring-disk and means for returning the measuring-disk to its normal position after the disk has revolved to its indicated position, substantially as specified.

8. A winding and measuring machine comprising rollers between which the material to be wound is passed, a spindle receiving the material, a revolving mechanism for revolving the spindle, a slotted graduated measuring-disk simultaneously operating during the winding of the material upon the spindle, means for releasing the measuring-disk, means for disengaging the operating mechanism when a specified amount is wound upon the spindle, and means for returning the measuring-disk to its normal position, substantially as specified.

9. A winding and measuring machine comprising rollers between which the material to be wound is passed, a tilted frame, an endless carrier mounted upon the tilted frame, a spindle carried by the endless carrier, arms carried by the frame and supporting the spindle, a revolving mechanism whereby said spindle is operated, a lever mechanism for placing the winding mechanism in and out of operation, a measuring-disk simultaneously operating with the winding mechanism to indicate the number of feet of material to be wound upon the spindle, and a mechanism for stopping the winding mechanism, substantially as specified.

In testimony whereof I have signed my name to this specification in presence of two subscribing witnesses.

CHARLES A. MARQUIS.

Witnesses:
 ALFRED A. EICKS,
 WALTER C. STEIN.